United States Patent
Weiler et al.

(10) Patent No.: US 10,272,884 B2
(45) Date of Patent: Apr. 30, 2019

(54) WINDOW-WIPING DEVICE FOR A VEHICLE, PRODUCTION METHOD OF A WINDOW-WIPING DEVICE AND MODULAR KIT FOR PRODUCING A WINDOW-WIPING DEVICE

(71) Applicant: Robert Bosch GmbH, Stuttgart (DE)

(72) Inventors: Michael Weiler, Buehl (DE); Joerg Becker, Gaggenau-Bad Rotenfels (DE)

(73) Assignee: Robert Bosch GmbH, Stuttgart (DE)

( * ) Notice: Subject to any disclaimer, the term of this patent is extended or adjusted under 35 U.S.C. 154(b) by 496 days.

(21) Appl. No.: 14/917,503

(22) PCT Filed: Aug. 6, 2014

(86) PCT No.: PCT/EP2014/066903
§ 371 (c)(1),
(2) Date: Mar. 8, 2016

(87) PCT Pub. No.: WO2015/032569
PCT Pub. Date: Mar. 12, 2015

(65) Prior Publication Data
US 2016/0214576 A1    Jul. 28, 2016

(30) Foreign Application Priority Data

Sep. 9, 2013    (DE) .................. 10 2013 217 962

(51) Int. Cl.
*B60S 1/38*    (2006.01)
*B60S 1/52*    (2006.01)
*B60S 1/34*    (2006.01)
(Continued)

(52) U.S. Cl.
CPC ........ *B60S 1/3808* (2013.01); *B29D 99/0025* (2013.01); *B60S 1/0413* (2013.01);
(Continued)

(58) Field of Classification Search
CPC ............ B60S 1/3411; B60S 2001/3812; B60S 1/3801; B60S 2001/3813; B60S 2001/3815
See application file for complete search history.

(56) References Cited

U.S. PATENT DOCUMENTS 2,847,694 A * 8/1958 Chambers ................. B60S 1/38
15/250.43
3,224,028 A * 12/1965 Peras ..................... B60S 1/3806
15/250.201
(Continued)

FOREIGN PATENT DOCUMENTS

CN    101746357 A    6/2010
CN    102381285 A    3/2012
(Continued)

OTHER PUBLICATIONS

International Search Report for Application No. PCT/EP2014/066903 dated Nov. 14, 2014 (English Translation, 3 pages).

*Primary Examiner* — Andrew A Horton
(74) *Attorney, Agent, or Firm* — Michael Best & Friedrich LLP

(57) ABSTRACT

The invention relates to a window-wiping device (2; 28, 30; 74; 78) for a vehicle, in particular a motor vehicle. The window-wiping device (2; 28, 30; 74; 78) comprises an elongated upper part (10), which is at least partially bendable, an elongated lower part (12), which is at least partially bendable, and a plurality of connecting elements (18) for connecting the upper part (10) and the lower part (12), wherein the connecting elements (18) are spaced apart along a longitudinal extension (8) of the wiper blade (2), wherein the connecting elements (18) are designed to enable motion of the upper part (10) and the lower part in relation to each other having a motion component along a longitudinal extension (8) of the wiper blade (2), wherein the connecting
(Continued)

elements are connected to the lower part (12) and the upper part (10) by means of rotational joints, and wherein the upper part and the lower part are connected to a connection piece.

26 Claims, 7 Drawing Sheets

(51) Int. Cl.
*B29D 99/00* (2010.01)
*B60S 1/04* (2006.01)

(52) U.S. Cl.
CPC .............. *B60S 1/3801* (2013.01); *B60S 1/524* (2013.01); *B60S 1/3411* (2013.01); *B60S 2001/3812* (2013.01); *B60S 2001/3813* (2013.01); *B60S 2001/3815* (2013.01); *B60S 2001/3898* (2013.01)

(56) References Cited

U.S. PATENT DOCUMENTS 5,361,896 A    11/1994  Yang
6,301,742 B1   10/2001  Kota

FOREIGN PATENT DOCUMENTS

| CN | 102427972 A | 4/2012 |
| CN | 102656065 A | 9/2012 |
| DE | 29813251 U1 | 11/1998 |
| GB | 1425568 | 2/1976 |
| GB | 2336765 | 11/1999 |
| WO | 9929546 | 6/1999 |
| WO | 2014072186 | 5/2014 |

\* cited by examiner

WINDOW-WIPING DEVICE FOR A VEHICLE, PRODUCTION METHOD OF A WINDOW-WIPING DEVICE AND MODULAR KIT FOR PRODUCING A WINDOW-WIPING DEVICE

BACKGROUND OF THE INVENTION

Embodiments of the invention relate to a windshield wiper device for a vehicle, in particular a motor vehicle, and also to a method for producing a windshield wiper device.

Windshield wiper devices typically have a wiper arm or wiper lever, wherein a wiper blade is moved on the windshield of a motor vehicle or the like. Here, the wiper blade is moved between an upper reversal point and a lower reversal point. In particular on windshields with intense changes in curvature, the wiper blade easily loses contact with the windshield. This can give rise, in particular in the case of intensely curved windshields, to unwiped wiping areas, and/or to smearing.

Since a wiping process must be optimized with regard to a multiplicity of parameters, such as for example an amount of rain falling on the windshield, a possible snow load on the windshield, the speed of the vehicle and associated wind pressure on the wiper arm, smearing cannot be reliably prevented simply by adapting the pressure of the wiper arm on the windshield. There is therefore a demand for further improving windshield wiper devices.

With regard to the improvement, there is a multiplicity of constraints that must additionally be allowed for. These include the outlay in terms of production or the production costs, the material costs, and also the possibility of providing customer satisfaction by way of flexible solutions. In the case of wiper devices for vehicles, it must be taken into consideration here that the cost pressure is ever-increasing and customer satisfaction can be increased through improved OEM conditions.

SUMMARY OF THE INVENTION

It is the object of the present invention to at least partially improve the problems of the prior art and/or ensure reliable, substantially smear-free wiping of a windshield of a vehicle.

The present invention and its embodiments advantageously permit particularly good adaptation of the windshield wiper device to the curvature of a windshield under the constraint of providing a flexible modular kit system for different customers.

According to one embodiment of the present invention, a windshield wiper device for a vehicle, in particular a motor vehicle, is proposed. The windshield wiper device comprises an elongate upper part which is designed to be at least partially flexible, an elongate lower part which is designed to be at least partially flexible, and multiple connecting elements for connecting the upper part and the lower part, wherein the connecting elements are spaced apart from one another along a longitudinal extent of the wiper blade, wherein the connecting elements are designed to permit a movement of the upper part and of the lower part relative to one another with a movement component along a longitudinal extent of the wiper blade, wherein the connecting elements are connected by way of rotary joints to the lower part and to the upper part, and wherein the upper part and the lower part are connected to an attachment piece. In a further typical embodiment, it may be provided that at least one, in particular all, of the elements selected from the following group can be individually exchanged: the upper part, the lower part, a connecting element of the multiple connecting elements, and the attachment piece. In this way, it is possible to provide a modular kit principle in particular with specifically adapted attachment pieces. A complex injection-molding tool for a single project can thus be dispensed with.

Preferred embodiments and special aspects of the invention will emerge from the dependent claims, from the drawings and from the present description.

In further typical embodiments, the upper part and the lower part are connected to the connecting elements by way of rotary joints or further rotary joints. The rotary joints on the upper part and lower part permit a movement in accordance with the fin-ray principle and thus serve for particularly good adaptation of the windshield wiper device or a wiper lip to the windshield.

In a further typical embodiment, the rotary joints and/or the further rotary joints to the upper part may comprise a first joint part and a second joint part. For example, the first joint part may be cylindrical or spherical, and the second joint part may comprise an undercut for receiving the first joint part. The two-part design of the rotary joints offers not only the provision of a modular kit principle but also numerous possibilities for favorably influencing joint characteristics such as the creep behavior. Materials can be selected so as to make it possible to realize reliable and durable joint characteristics even in the presence of high temperature fluctuations and/or in the presence of permanently high ambient temperatures.

In a further typical embodiment, the first and the second joint part may be clipped to one another or plugged together. In this way, particularly simple assembly in accordance with the modular kit principle is realized.

In a typical embodiment of the invention, the upper part and the lower part may be fixedly connected to one another, in particular in an end region of the windshield wiper device, at an outer connecting position. The outer connecting position is in particular formed in front of the connecting elements as viewed in a direction pointing from the outside inward in the direction of longitudinal extent of the windshield wiper device. This design advantageously ensures particularly good stability of the windshield wiper device. Furthermore, particularly high flexibility and capacity for adaptation to the windshield curvature can be achieved, wherein a uniform contact pressure of the lower part against the windshield is realized. In a further advantageous refinement, the upper part and the lower part may be connected to one another at the outer connecting position such that the upper part and lower part form a wedge shape. The upper part and lower part are in particular connected to one another at their ends. In further refinements, it is possible for one or more first connecting element and one or more second connecting elements to be provided as follows. A first connecting element is arranged relative to a second connecting element such that the first connecting element is situated, relative to the second connecting part, in the direction of the connecting position of the upper part and of the lower part, that is to say in the direction of the tip of the wedge shape, or at the outside. Here, the first connecting element is shorter than the second connecting element. For example, it is possible for at least 70% or at least 50% of the connecting elements to be designed so as to become shorter toward the outside, that is to say in the direction of the connecting position of the upper part and of the lower part.

In a further embodiment, it may be provided that the longitudinal axes of the connecting elements run at angles relative to the lower part, which angles are provided so as to be from 45° to 135°, in particular from 65° to 115°. This advantageously ensures that a force acting on the lower part is transmitted in a particularly effective manner to the upper part. Furthermore, a particularly stable windshield wiper device can be realized in this way.

In a further embodiment, the spacing between in each case two adjacent connecting elements may be less than 50 mm, in particular less than 30 mm. In this way, a particularly high level of flexibility of the windshield wiper device, in particular of its lower part, and good adaptation to the curvature and changes in curvature of the windshield to be wiped, are ensured.

In a further advantageous embodiment, a flexible windshield wiper lip is attached to a side, which is averted from the upper part, of the lower part. A particularly high level of functionality of the windshield wiper device is advantageously realized in this way.

In a further advantageous embodiment, the windshield wiper lip may be inserted, in particular detachably connectable, into a recess or rail on the lower part. In this way, the windshield wiper lip can be easily exchanged, wherein in particular, an exchange of the windshield wiper lip can be realized with little material outlay.

In a further advantageous embodiment, the upper part and/or the lower part may have a supply line for water; in particular, the supply line may be a pipe for conducting water, in particular a pipe formed integrally with the upper part and/or lower part. Furthermore, the supply line may comprise openings, in particular nozzle openings. In this way, a windshield washing water supply can be provided which is provided for example directly during spraying of the upper part and/or of the lower part.

In a further embodiment, between the upper part and the lower part, there may be formed an intermediate space in which there is arranged a spoiler for influencing an air flow which ingresses into the intermediate space. In this way, the precise wiping of the windshield can advantageously be further improved. For example, the spoiler may be designed such that, specifically at high travelling speeds of the vehicle, compensation of a wind lift force is realized, which otherwise reduces the contact pressure of the windshield wiper device against the windshield. The spoiler may furthermore be designed such that a wind lift action is utilized to push the windshield wiper device downward in the direction of the windshield. The contact pressure of the windshield wiper device is increased, and the precise abutment thereof against the curvature of the windshield is ensured.

In a further embodiment, the rotary joints may have a flexural stiffness of 75 Nmm/rad or less. Good flexibility for the fin-ray effect can be provided in this way.

In a further embodiment, a method for producing a windshield wiper device, in particular a windshield wiper device according to one of the embodiments described here, is provided. The method comprises producing an upper part which is designed to be at least partially flexible, producing a lower part which is designed to be at least partially flexible, producing multiple connecting elements for connecting the upper part and the lower part, producing an attachment piece, wherein at least one of the elements selected from the following group are produced by injection molding: upper part, lower part, the multiple connecting elements, and the attachment piece; and assembling the elements selected from the following group: upper part, lower part, the multiple connecting elements, and the attachment piece, wherein the assembling comprises in particular plugging or clipping, wherein the connecting elements are spaced apart from one another along a longitudinal extent of the wiper blade, and wherein the connecting elements are designed to permit a movement of the upper part and of the lower part relative to one another with a movement component along a longitudinal extent of the wiper blade. In this way, it is possible to provide a wiper lever modular kit, that is to say a modular kit principle for a windshield wiper device or a wiper lever. A complex injection-molding tool for a single project can thus be dispensed with.

Preferred embodiments and particular aspects of the invention will emerge from the dependent claims, from the drawings and from the present description.

In a typical embodiment, the assembling of the attachment piece may comprise plugging, adhesive bonding or lasering. The attachment piece can thus be easily provided on a customer-specific basis, that is to say in a manner adapted to a vehicle.

In a further embodiment, a method for producing a windshield wiper device, in particular a windshield wiper device according to one of the embodiments described here, is provided. The method comprises the production of an upper part which is designed to be at least partially flexible and which has first joint parts, the production of a lower part which is designed to be at least partially flexible and which has first joint parts, and the production of multiple connecting elements for the connection of the upper part and the lower part, wherein the connecting elements each have second joint parts. The method comprises clipping the first and second joint parts together. Alternatively or in addition to a clipping-together action, it is possible, as a further optional modification, for the upper part and/or the lower part to be bent in order to deform the respective first joint part so as to receive the second joint part.

The windshield wiper device is advantageously designed such that torsional movements are possible between the connecting elements and the lower part. This ensures a high level of flexibility and adaptation capability of the lower part. Furthermore, in an advantageous refinement of the invention, the connecting elements are likewise fastened by way of rotary joints to the upper part. This ensures even better capability of the windshield wiper device to adapt to the windshield to be wiped, wherein, in particular, it is possible to realize a high contact pressure on the windshield, and thus a particularly good cleaning and wiping action. The windshield wiper device is particularly advantageously designed such that torsional movements are likewise possible between the connecting elements and the upper part. The rotary joints are advantageously hinges. The windshield wiper device according to the invention is in particular designed such that the upper part and lower part are designed in the manner of beams. Furthermore, it is advantageously possible for the upper part and lower part to be at least partially resiliently elastic. In one embodiment of the invention, the upper part and lower part are displaceable relative to one another. In a further embodiment, the upper part is arranged opposite the lower part. The connecting elements themselves are fastened to inner sides, which face toward one another, of the upper and lower parts. The connecting elements are particularly advantageously designed to be resistant to buckling.

In yet further embodiments that may be combined with other embodiments, the lower part is, in the unloaded state, of convex form, that is to say with a curvature which projects away from the upper part in a central region. Upon coming into contact with a windshield, the windshield wiper device as per the embodiments described here can typically then, proceeding from the convex shape of the lower part, assume the corresponding concave shape of the lower part adapted to the windshield.

In a further embodiment, a modular kit for the production of at least two windshield wiper devices as per the embodiments described herein is provided. The modular kit comprises elements from the following group: at least two elongate upper parts which are designed to be at least partially flexible, at least two elongate lower parts which are designed to be at least partially flexible, and multiple connecting elements for connecting one of the at least two upper parts and one of the at least two lower parts, wherein the connecting elements are spaced apart from one another along a longitudinal extent of the wiper blade, wherein the connecting elements are designed to permit a movement of the upper part and of the lower part relative to one another with a movement component along a longitudinal extent of the wiper blade, wherein at least two different windshield wiper devices can be assembled from the at least two elongate upper parts, the at least two elongate lower parts and the multiple connecting elements, and wherein at least one of the elements used is identical for both of the two different windshield wiper devices.

BRIEF DESCRIPTION OF THE DRAWINGS

Exemplary embodiments of the invention are illustrated in the figures and will be described in more detail below. In the figures.

DETAILED DESCRIPTION

Below, unless stated otherwise, the same reference designations are used for identical elements and elements of identical action.

Figure 1A:
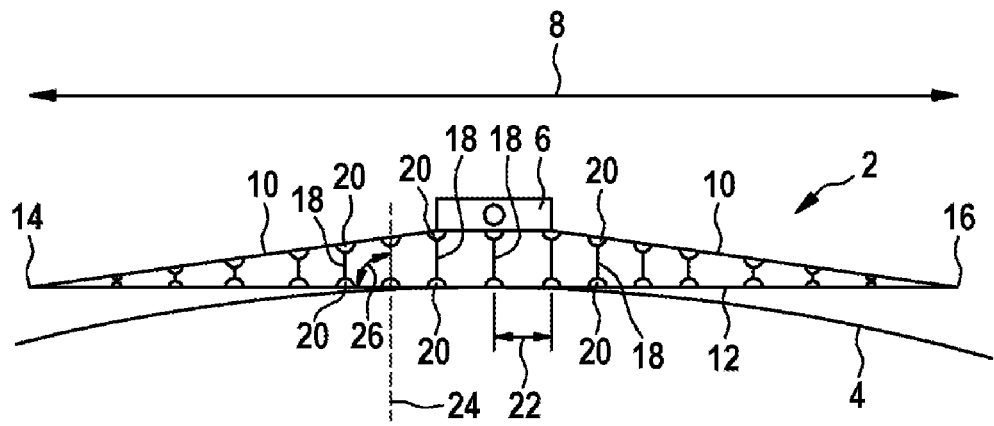
FIG. 1A is a schematic illustration of an exemplary embodiment of a windshield wiper device according to the invention in the form of a wiper blade, in a basic position.
Figure 1B:
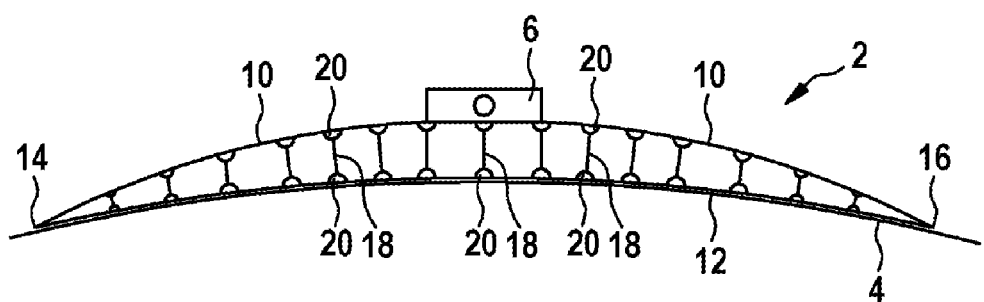
FIG. 1B is a schematic illustration of the wiper blade as per FIG. 1A in a position placed against a windshield.

FIGS. 1A and 1B are a schematic illustration of an exemplary embodiment of a windshield wiper device according to the invention. In this exemplary embodiment, the windshield wiper device is a wiper blade 2. The wiper blade 2 serves for wiping a windshield 4 of a vehicle, which is for example a motor vehicle, in particular an automobile. Normally, the wiper blade 2 is attached to a windshield wiper arm which, for the wiping action, is driven by way of a motor. For this purpose, the wiper blade 2 has a bracket 6 by which it can be fastened to the windshield wiper arm. The wiper blade 2 is, in FIG. 1A, situated in a basic position in which it is at least partially raised from the windshield 4. The wiper blade 2 has an elongate extent 8 and has an elongate upper part 10 and a likewise elongate lower part 12. The longitudinal extents of the upper part 10 and of the lower part 12 correspond substantially to the longitudinal extent 8 of the wiper blade 2.

Both the upper part 10 and the lower part 12 are, or may be designed as, flexible beams which, in FIG. 1, are for example in each case of unipartite form. This makes it possible to realize a particularly stable construction. It is likewise possible for only in each case one part of the upper part 10 and/or of the lower part 12 to be designed to be flexible. Furthermore, it is alternatively possible for the upper part 10 to be formed in two parts, wherein then, in each case one end of the two parts of the two-part upper part 10 is fastened to the bracket 6. In some embodiments that may be combined with the other embodiments described here, for the upper part 10 and/or the lower part 12, a material is used which has a modulus of elasticity which lies in a range between 0.005 kN/mm$^2$ and 0.5 kN/mm$^2$, in particular 0.01 kN/mm$^2$ and 0.1 kN/mm$^2$. This makes it possible to realize suitable flexibility of the upper part 10 and of the lower part 12. Together with a suitably designed cross-sectional area of the upper part 10 and of the lower part 12, optimum bending stiffness is thus realized. The upper part 10 and the lower part 12 are arranged so as to be situated opposite one another. Both ends of the upper part 10 are fixedly connected, at outer connecting positions 14 and 16, to in each case one end of the lower part 12. Otherwise, the upper part 10 and the lower part 12 are spaced apart from one another.

The upper part 10 and the lower part 12 are connected to one another by connecting elements 18. In particular in the basic position of the wiper blade 2, said connecting elements run approximately transversely to the longitudinal extent 8 of the wiper blade 2 in FIG. 1A. In further embodiments that may be combined with the embodiments described here, said connecting elements may also run at an angle of greater than 90° or less than 90°, in particular at mutually different angles. The connecting elements 18 are fastened by way of rotary joints 20 to inner longitudinal sides, which face toward one another, of the upper part 10 and of the lower part 12. The rotary joints 20 are in this case hinges, which may be provided by way of a plugging or clipping action.

The connecting elements 18 are spaced apart from one another along the longitudinal extent of the wiper blade 2. The spacings between in each case two adjacent connecting elements 18 are equal. Said spacings may however also be selected so as to differ. The spacings are advantageously less than 50 mm, in particular less than 30 mm. In the present exemplary embodiment, one spacing 22 is illustrated as a representative of the spacings between in each case two connecting elements 18. The connecting elements 18 are, in particular in the basic position of the wiper blade 2, fastened to the lower part 12 such that their longitudinal axes run at angles 26 of between 45° and 135°, with the angles lying in particular between 65° and 115°, with respect to the lower part 12. For example, said angles may vary in sub-regions along the longitudinal extent, that is to say may increase or decrease from one connecting element to the next connecting element. In the present exemplary embodiment, this applies correspondingly to the fastenings of the connecting elements 18 to the upper part 10. In FIG. 1A, one longitudinal axis 24 is illustrated as an example of the longitudinal axes of the connecting elements 18, and one angle 26 is illustrated as an example of the angles between the connecting elements 18 and the lower part 12.

The spacings between the upper part 10 and the lower part 12 are defined primarily by the lengths of the connecting elements 18. The lengths of the connecting elements 18 increase in size proceeding from the two outer connecting positions 14, 16 as far as approximately the locations at which the bracket 6 that is attached to the upper part 10 begins. In this way, in the side view of the wiper blade 2 as per FIG. 1A, the upper part 10 and lower part 12 form a double wedge, wherein the tips of the two wedges point in opposite directions. The connecting elements are designed to be resistant to buckling.

In particular, embodiments of the present invention relate to rear windshield wipers. In such a situation, it is typically the case that in each case only one half of the wiper blade shown in FIGS. 1A and 1B is provided, and the upper part and the lower part are fastened to the bracket 6. In this case, the bracket 6 typically forms an attachment piece which can be provided on an OEM-specific basis for the fastening to the spindle for the wiper on the rear windshield. Furthermore, for a rear windshield wiper, it is typically the case that a single wedge shape rather than a double wedge shape is formed.

FIG. 1B is a schematic illustration of the wiper blade 2 as per FIG. 1A in a position placed against the windshield 4. Since the windshield 4 has a curvature, it is the case that, when the wiper blade 2 bears against the windshield 4, contact pressure forces act on the lower part 12. Since the upper part 10 and the lower part 12 are flexible beams and the connecting elements 18 are mounted rotatably on the upper part 10 and lower part 12, the upper part 10 and the lower part 12 are displaceable relative to one another. Owing to the pressure forces that act on the lower part 12 from below, the wiper blade 2 bends in the direction from which the pressure forces originate, and bears exactly against the curvature of the windshield 4.

Owing to the construction of the embodiments described here, it is the case that, when a force is exerted on the lower part (by the windshield 4), the lower part bends in the direction from which the force acts. This is realized by way of the connection of the upper part 10 and of the lower part at connecting positions 14 and/or 16, the shape, and by way of rotary joints at the connection between the connecting elements and the upper part and lower part.

In the illustration as per FIG. 1B, there is a small spacing between the wiper blade 2 and the windshield 4, which spacing serves here merely for the illustration of the windshield 4 and of the wiper blade 2 and, in reality, substantially does not exist when the wiper blade 2 bears against the windshield 4. Furthermore, in the case of most wiper blades, a rubber lip is situated on the lower side, averted from the upper part 10, of the lower part 12, which rubber lip (not illustrated for the sake of clarity) is set down on the windshield 4 for wiping purposes.

A windshield wiper device of this kind, for example a windshield wiper arm or a windshield wiper arm with windshield wiper blade, has the advantage of improved adaptation to a windshield of a motor vehicle. In the case of a conventional windshield wiper blade, the upper part thereof is conventionally rigid, that is to say is not designed to be flexible.

A windshield wiper device as per embodiments described here utilizes the effect of tailfins of certain fish species, which, under the action of lateral pressure, do not deflect in the direction of the pressure but curve in the opposite direction, that is to say in the direction from which the pressure originates. This principle is also referred to as the "fin-ray" principle.

FIGS. 1A and 1B show a wiper blade 2 with a longitudinal extent 8 extending substantially between the connecting positions 14 and 16. Such an arrangement is commonly used for front windshield wipers. Alternatively, however, a windshield wiper device may also have only one connecting position which, in analogy to FIGS. 1A and 1B, corresponds to a halving of the windshield wiper device, and wherein, for example, a rotary spindle is provided at a position of the bracket 6 or on an attachment piece (see for example FIG. 6A). Such an arrangement is commonly used for rear windshield wipers. This is illustrated by way of example inter alia in FIGS. 2A and 2B. Optional refinements and details such as are described in individual embodiments may be used generally for both variants of an arrangement of a windshield wiper device.

Figure 2A:
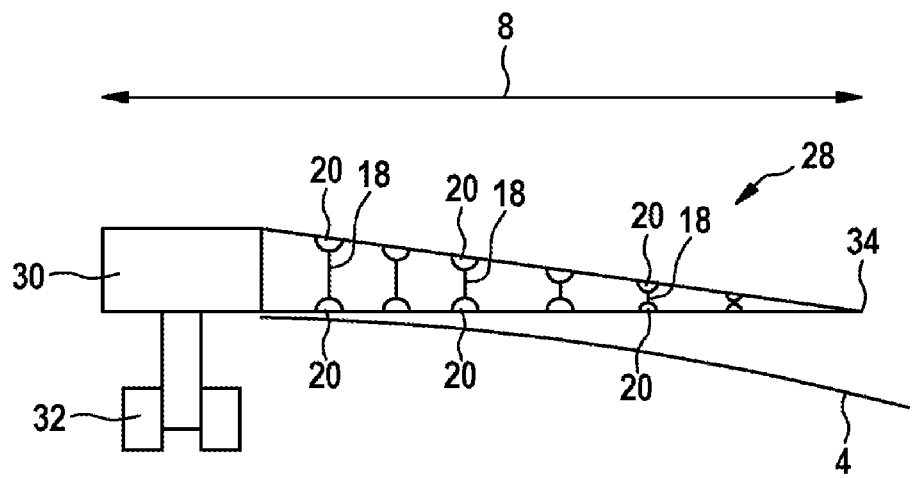
FIG. 2A is a schematic illustration of an exemplary embodiment of a windshield wiper device according to the invention in the form of a wiper blade, in a basic position.

FIG. 2A is a schematic illustration of a further exemplary embodiment of the windshield wiper device according to the invention in the basic position. Here, the windshield wiper device is a wiper arm with an integrated wiper blade 28 which is attached to a fastening part 30 or an attachment part. The fastening part 30 is connected to a wiper motor 32 which drives the fastening part 30 in order to wipe the windshield 4. The wiper blade 28 is of wedge-shaped design, wherein one end of the upper part 10 is fixedly connected at an outer connecting position 34 to one end of the lower part 12. The respective other ends of the upper part 10 and of the lower part 12 are fastened to the fastening part 30. With regard to the basic construction and in particular the fastenings of the connecting elements 18, the windshield wiper device as per FIG. 2A corresponds in principle to that as per FIG. 1A.

Figure 2B:
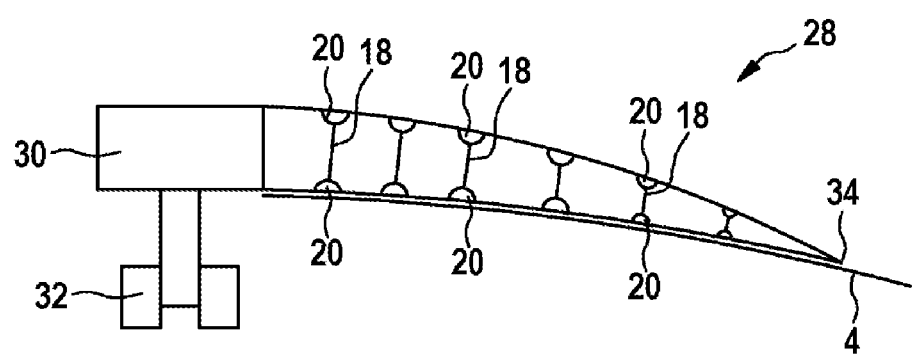
FIG. 2B is a schematic illustration of the wiper blade as per FIG. 2A in a position placed against a windshield.

FIG. 2B is a schematic illustration of the wiper blade 28 with integrated wiper arm 30 as per FIG. 2A in a position placed against the windshield 4. In this case, too, pressure forces act on the lower part 12 of the wiper blade 28 from below from the direction of the windshield 4, such that the lower part 12 and the upper part 10 bend in the direction of the windshield 4.

Both in FIGS. 1A and in FIG. 2A, the wiper blade is illustrated in its position in which it has not been placed against the windshield, such that the lower part 12 is of substantially straight form. According to yet further embodiments that may be combined with other embodiments, the lower part is, in the unloaded state, of convex form, that is to say with a curvature which projects away from the upper part in a central region. Upon coming into contact with a windshield, the windshield wiper device as per the embodiments described here can typically then, proceeding from the convex shape of the lower part, assume the corresponding concave shape of the lower part adapted to the windshield.

Figure 3:
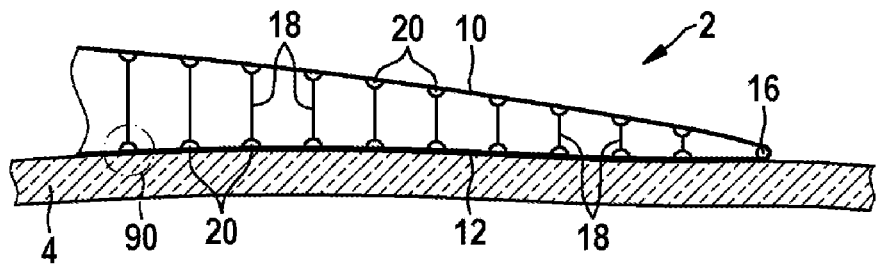
FIG. 3 shows a detail of a schematic illustration of an exemplary embodiment of a windshield wiper device according to the invention in the form of a wiper blade.

FIG. 3 shows a detail of a schematic illustration of a wiper blade 2 of a windshield wiper device. The wiper blade 2 serves for wiping a windshield 4 of a vehicle, for example of a motor vehicle, in particular of a passenger motor vehicle. In embodiments of the present invention, the wiper blade is a fin-ray wiper. The upper part and the lower part are connected at a connecting position 16. On an upper part 10 and a lower part 12 there are arranged connecting elements 18 which are connected to the upper part and to the lower part by way of joints 20. In typical embodiments of the present invention, a group of joints exists, which are advantageously suitable for use in the case of fin-ray wipers, in particular on motor vehicles.

The following figures illustrate different variants of said joints. In particular, FIGS. 4A to 4E illustrate a detail 90 illustrated in FIG. 3. In typical embodiments, the joints are designed so as to exhibit one degree of freedom. That is to say, the rotary joints are typically hinges.

Figure 4A:
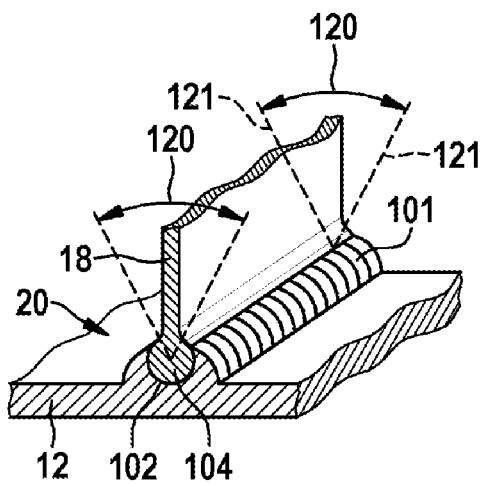
FIGS. 4A to 4E are schematic illustrations of rotary joints as per exemplary embodiments of the windshield wiper device according to the invention in the form of a wiper blade, wherein a first joint part and a second joint part are used to form the joint.

FIG. 4A shows a first joint variant as per embodiments of the present invention. The joint as per the detail 90 illustrated in FIG. 3 is illustrated. The other joints on the lower part 12 and on the upper part 10 of the wiper blade 2 may be designed analogously. FIG. 4A shows the lower part 12 with a joint part 102 which is provided in cylindrical form or as a hollow cylinder which is equipped with an undercut. The connecting element 18 is formed with a corresponding joint part 104. The corresponding joint part 104 is a cylinder provided on the connecting element 18, or a cylinder which is formed integrally with the connecting element 18. The joint part 102, that is to say the hollow cylinder with undercut, may also be formed integrally with the lower part 12 of the wiper blade 2.

The joint 20 thus gives rise to mobility of the connecting element 18 within the range of the angle 120. This is likewise illustrated by auxiliary line 121. In typical embodiments, the connecting element 18 may extend along the axis of rotation of the cylinder 104. The rotary joint has a first joint part 102 and a second joint part 104.

Figure 4B:
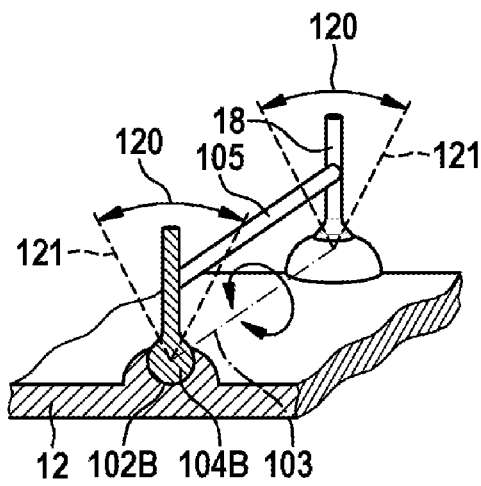

FIG. 4B shows a further joint variant as per embodiments of the present invention. The rotary joint for the connecting element or the connecting elements 18 is provided by two balls 104B. The joint part 102B which is attached to the lower part 12, or the joint part 102B which is formed integrally with the lower part 12, is adapted so as to receive the joint part 104B, that is to say the ball, by way of an undercut. In typical embodiments, one or two connecting elements 18 may be provided. If two connecting elements 18 are provided, these are connected one another, so as to form an axis 103, by way of a transverse web 105 between the two connecting elements, so as to define a movement illustrated by angle 120 and auxiliary line 121. In this way, the movement can be restricted substantially to a plane, which in FIG. 3 corresponds to the plane of the drawing.

Figure 4C:
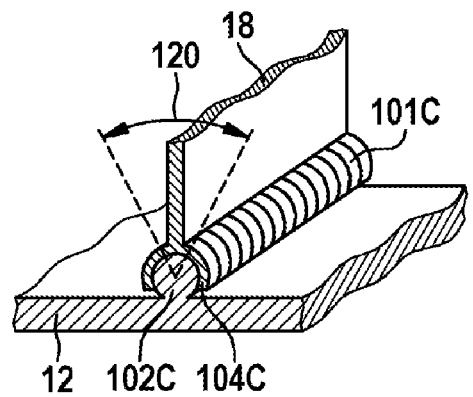

FIG. 4C shows a variant of a joint as per embodiments of the invention, wherein FIG. 4C is similar to FIG. 4A. By contrast to FIG. 4A, the embodiment illustrated in FIG. 4C has a joint part 102C, which is in the form of a cylinder, and a joint part 104C, which is in the form of a hollow cylinder with an undercut. As already discussed, the joint part 102C may be formed integrally with the lower part 12 of the wiper arm 2 or may be attached to the lower part 12. Analogously, the joint part 104C, that is to say the hollow cylinder with undercut, may be formed integrally with the connecting element 18 or may be attached to said connecting element.

Figure 4D:
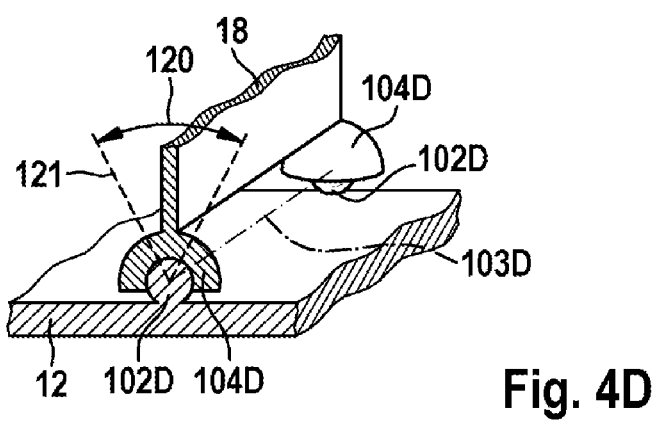

FIG. 4D is in turn analogous to FIG. 4B, wherein the joint part 102C is in the form of a ball, and the joint part 104C is in the form of a hollow ball with undercut. The hollow balls may in turn be connected to one another by way of an axis 103D.

In FIGS. 4A to 4D, the connecting elements 18 may be clipped onto the lower part 12. The clipping may be performed either in the case of finished individual parts, or in the still-warm state of the workpieces within a tool for producing the workpieces.

Figure 4E:
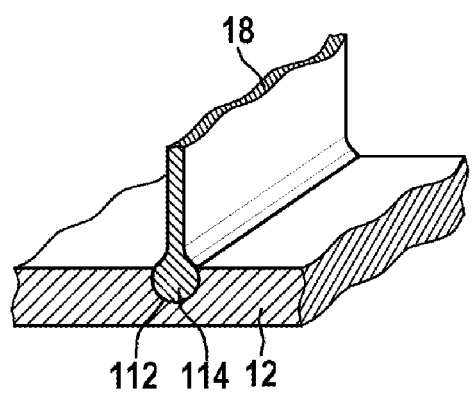

FIG. 4E shows a further embodiment in which a joint having a first joint part 112 and a second joint part 114 is provided. FIG. 4E illustrates the joint parts as cylindrical joint parts, such as are also illustrated for example in FIG. 4A or 4C. It is however analogously also possible for the joint parts to be in the form of balls, analogously to FIG. 4B or FIG. 4D.

In embodiments of the present invention, it is possible for different windshield wiper devices or wiper levers to be assembled in accordance with a modular kit principle or from a wiper lever modular kit. Here, individual components may be used in more than one of the different windshield wiper devices, which yields redundancy with regard to the individual components in the compiling of the modular kit. In this way, it is possible to avoid relatively complex injection-molded products, in the case of which, typically, an individual wiper lever is in each case manufactured (possibly in low unit quantities) on a customer-specific or project-specific basis.

Figure 5:
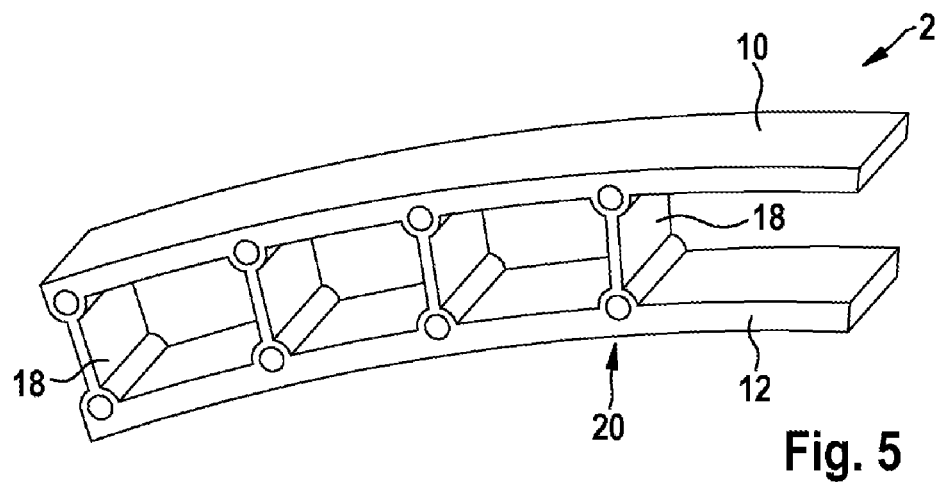
FIG. 5 is a schematic illustration of a detail of a further exemplary embodiment of a windshield wiper device according to the invention.

FIGS. 5, 6A to 6B and 7 show the principle of the modular kit. FIG. 5 shows a detail of an assembled state of a wiper blade 2. An upper part 10 and a lower part 12 are assembled by way of a multiplicity of connecting elements 18. In this way, a windshield wiper device can be formed which functions in accordance with the fin-ray principle. Joints 20 are provided at the connecting points of the connecting elements 18 to the upper part and/or to the lower part, in particular to the upper part and to the lower part. Said joints are formed by virtue of a first joint part 102, which is provided for example on the upper part and/or on the lower part, and a second joint part 104, which is provided for example on the connecting element 18, being clipped or plugged together.

Figure 6A:
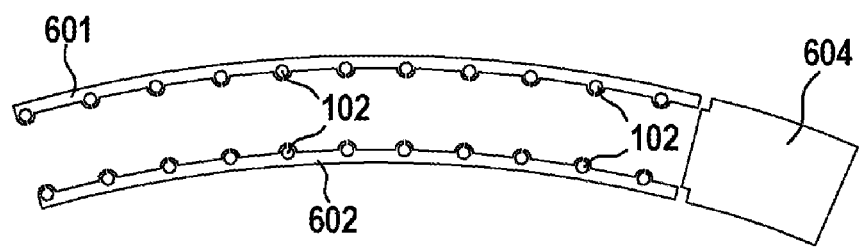
FIGS. 6A and 6B are a schematic illustration showing components for the assembly of a windshield wiper device as per embodiments of the present invention.
Figure 6B:
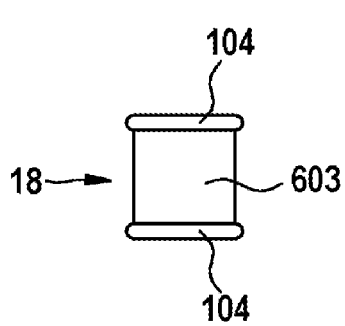

As shown in FIGS. 6A to 6B, the modular kit principle involves four different components 601-604. Typically, said elements are an upper part 10, that is to say an upper rail 601 in FIG. 6A, and a lower part 12, that is to say a lower rail 602 in FIG. 6A. The upper rail and the lower rail each have first joint parts 102.

In embodiments of the present invention, it is furthermore the case that a multiplicity of connecting elements 18, that is to say intermediate webs, is provided. These are illustrated by way of example in FIG. 6B, wherein the connecting elements or intermediate webs have second joint parts 104 and connecting webs 603. The connecting elements or intermediate webs are provided in a variety of sizes in the context of the modular kit principle. It is thus possible for relatively short or relatively small connecting elements to be used closer to the connecting position 16 or 34 (see FIG. 1A or 2A), whereas relatively large connecting elements are used closer to an attachment piece. In this way, through the selection of the connecting elements that are assembled with the upper part and with the lower part, a wedge shape can be realized. Furthermore, different sizes of connecting elements may also be provided for different sizes of wiper arms. Here, identical connecting elements may be used as "small" connecting elements (close to the connecting position) for a relatively large windshield wiper device and as relatively large connecting elements (close to the attachment piece) for a relatively small windshield wiper device.

In typical embodiments, the number of different sizes of connecting elements within the modular kit principle may be limited to 20 or fewer, for example to 10 or fewer. The connecting elements or intermediate webs are thus platform parts which permit multiple use, that is to say use for different windshield wiper devices. Thus, they can be produced in high volumes, that is to say in high unit quantities, which reduces the unit price.

In yet further embodiments, it is possible for the connecting elements or intermediate webs to also be adapted to customer requirements in a simple manner. They may vary in terms of stiffness and/or hardness, or may even be colored, printed, labelled with advertisements, or individualized in some other way.

As can be seen from FIG. 6A, the upper part (upper rail) and the lower part (lower rail) may be attached, for availability, to an attachment piece 604. Said rails 601 and 602 may be mounted on the attachment piece for example by way of a plugging, adhesive bonding, lasering, clipping or similar action. It is thus possible, as a constituent part of the modular kit, to select from a multiplicity of attachment pieces, wherein the attachment pieces can be selected specifically for the customers or projects or vehicles. Thus, in this case too, the complexity of the tool for production is reduced, which yields OEM pooling with likewise higher unit quantities and the associated lower costs.

Embodiments of the present invention permit the use of injection-molding tools which are simpler in relation to injection-molding tools in the case of which a wiper blade is produced in one piece or in ready-from-the-mold form. In particular, injection-molding tools for rails or upper part and/or lower part and for the connecting elements, that is to say the intermediate webs, may be provided separately from one another. Consequently, the production methods encompass, if appropriate, injection-molding one element of the modular kit in one injection-molding tool and injection-molding an other element in another injection-molding tool.

By way of the separate production, it is possible, in some embodiments, for the material selected for a rail or for the upper part and/or the lower part to be selected to differ from the material of the connecting element. In typical embodiments, the windshield wiper device, in particular the wiper blade, is composed of multiple materials from a group comprising: PP, PE, POM, PA, TPE (thermoplastic elastomer), for example TPE-S, TPE-O, TPE-U, TPE-A, TPE-V and TPE-E. Through the selection of different materials, it is also possible, depending on the element, to use inexpensive materials, which reduces the costs for the windshield wiper device.

Figure 7:
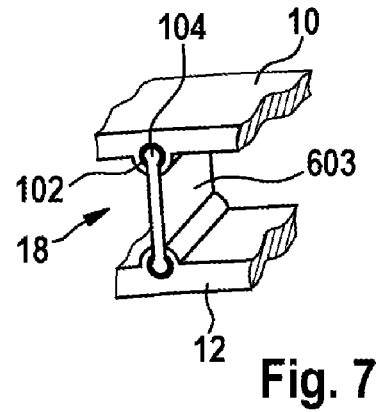
FIG. 7 is a schematic illustration of a detail of a further exemplary embodiment of a windshield wiper device according to the invention, with the connection of the components from FIGS. 6A and 6B being illustrated on an enlarged scale.

FIG. 7 shows an enlarged detail of an assembled connecting element 18 or of an intermediate web on an upper part 10 (on an upper rail) and on a lower part 12 (on a lower rail). The first joint parts 102 are formed by openings in the respective rail. The second joint parts 104 are formed by protruding elements which can be inserted into the openings. It is however alternatively also possible to use spherical or cylindrical joint parts, wherein in each case one undercut is provided. This is described in FIGS. 4A to 4E.

Figure 8:
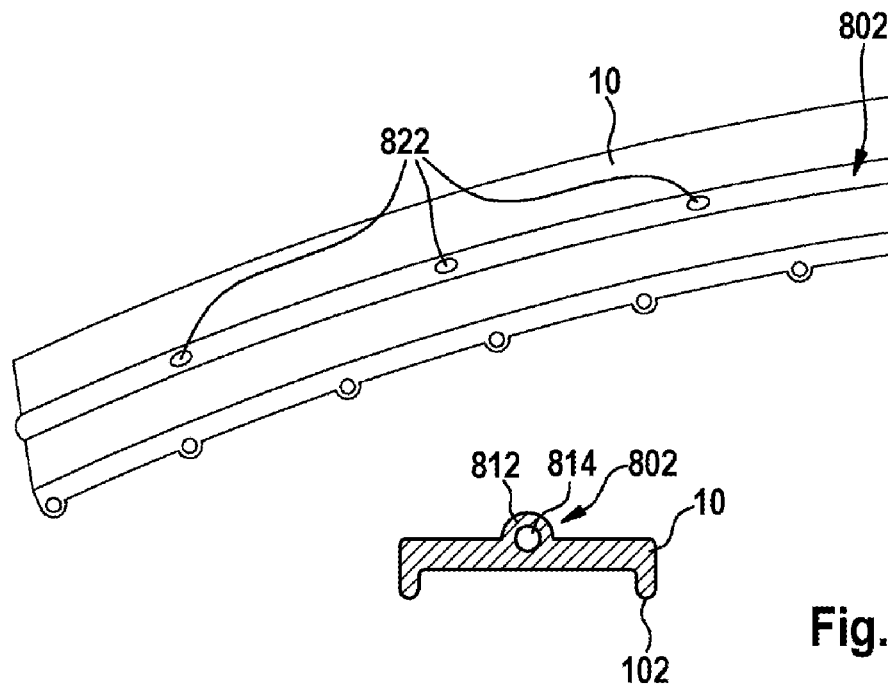
FIG. 8 is a schematic illustration of a detail of an upper part of a wiper blade as per further embodiments of the present invention.
Figure 9:
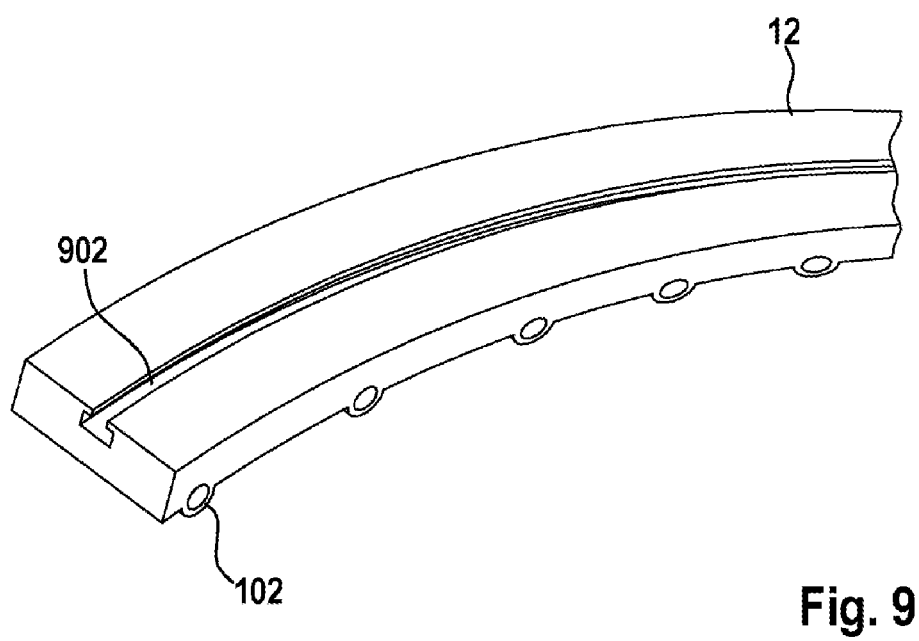
FIG. 9 is a schematic illustration of a detail of a lower part of a wiper blade as per further embodiments of the present invention.

The simplified injection-molding tools described above furthermore permit easy implementation of further features, such as are illustrated by way of example in FIGS. 8 and 9.

FIG. 8 shows a rail, for example the rail as upper part 10, with an integrated water guide 802 for windshield washing water being provided. The water guide 802 comprises a line 812, for example a pipe, wherein washing water can be conducted in a cavity. At at least one position along the longitudinal extent of the windshield wiper device, preferably at a multiplicity of positions, for example 5 to 50 positions, openings 822 may be provided in the line 812. For example, the openings may be in the form of nozzles. The washing water can be sprayed onto the windshield through the openings. An integration of a water guide for washing water, for example including spray nozzles, can thus be realized in a plastics tool or injection-molding tool. In other embodiments, however, a water guide may also be provided in the lower part, or in the lower part and in the upper part.

FIG. 9 shows a rail, which is typically a lower part 12. An installation rail 902 for a wiper lip is integrated on the lower part. An integration of further elements can be realized in a simple manner inter alia by way of the simplification of the injection-molding tools in the modular kit principle. A wiper lip can be easily inserted into, or fastened to, the installation rail. Thus, in the event of wear of the wiper lip, said wiper lip can be easily exchanged merely by removal of said wiper lip from the rail and insertion of a new wiper lip. Furthermore, in the case of such a manner of exchange of the wiper lip, the material outlay for replacement is reduced or minimal, which yields an improvement with regard to costs and ecology.

With regard to FIG. 9, a further embodiment of a modular kit may also be provided such that a wiper lip is a further element of the modular kit. Here, it is possible for a limited number of wiper lips to be provided for different vehicle types, customers and/or projects, and/or for different conditions (summer/winter). These can be easily provided in the context of the modular kit principle.

Figure 10:
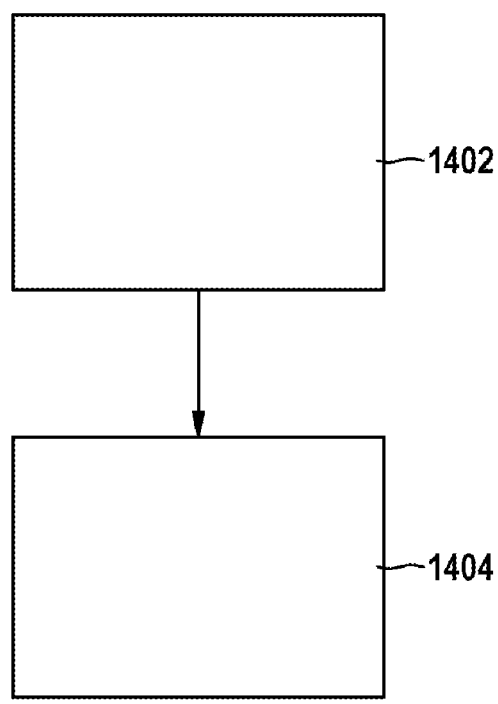
FIG. 10 shows a flow diagram for illustrating embodiments of the production of windshield wiper devices as per further embodiments of the present invention.

FIG. 10 schematically shows a flow diagram for illustrating methods for producing a windshield wiper device, for example a windshield wiper device as has been described in conjunction with FIGS. 4A to 4E. The method comprises (see step 1402) the production of an upper part which is designed to be at least partially flexible and which has first joint parts, the production of a lower part which is designed to be at least partially flexible and which has first joint parts, and the production of multiple connecting elements for the connection of the upper part and the lower part, wherein the connecting elements each have second joint parts. The method comprises (see step 1404) clipping or plugging the first and second joint parts together. Furthermore, the method comprises the connection to a bracket or to an attachment piece.

FIG. 10 may also be used for illustrating a method for producing a device such as has been described in particular with regard to FIG. 4E. The method comprises (see step 1402) the production of an upper part which is designed to be at least partially flexible and which has first joint parts, the production of a lower part which is designed to be at least partially flexible and which has first joint parts, and the production of multiple connecting elements for the connection of the upper part and the lower part, wherein the connecting elements each have second joint parts. The method comprises (see step 1404) the bending-open of the upper part and/or lower part such that the openings of the hollow cylinders 112 in the region of the undercut are enlarged. It is thus possible for the connecting element 18 to be inserted, whereupon the bending of the upper part and/or lower part is reduced such that the undercut engages around the cylinder 114. In this way, a multiplicity of connecting elements can be inserted from one end of the wiper blade to the opposite end of the wiper blade. In particular, this may be performed both with the upper part and with the lower part in order to assemble the windshield wiper device. Furthermore, the method comprises the connection to a bracket or to an attachment piece.

In typical embodiments of the present invention that may be combined with other embodiments, the joint (see reference designation 20 in FIG. 9) or the rotary joint 20 is a hinge. That is to say, 2 planes are rotatably connected to one another. In other words, a rotary joint or a bearing with one degree of freedom is provided.

In the case of the rotary joints as per FIGS. 4A to 4E, that is to say in the case of joints or hinges of two-part form, it is possible in particular to provide good creep behavior, for example high creep resistance. The materials may be selected such that, in particular in the presence of high temperatures, no permanent deformation of the joints occurs. In this way, it is possible to realize improved durability of the wiper blade 2. In particular for two-part joints that are not produced by way of a two-component injection-molding process, the cylinder or the ball or the hollow cylinder or the hollow ball, in each case with an undercut, may be manufactured from the same material. Temperature fluctuations thus have only a very slight adverse effect on the function of the joint.

Even though the two-part design of the joint is possibly associated with slightly increased production costs (the joints must be clipped), this may be advantageous in particular for the construction of a modular kit principle, because in the case of identical elements being used for different windshield wiper devices, the unit quantities produced can be increased, and therefore, in this regard, costs can be reduced.

Even though FIGS. 4A to 4E each illustrate only a detail of the lower part 12 with a corresponding joint 20, it is the case in embodiments of wiper blades that a corresponding joint is likewise provided at other positions of the lower part 12 and at the positions of the upper part 10. In yet further embodiments that may be combined with other embodiments, several of the joint variants described in this disclosure may be provided together with one another for implementation on one wiper blade. For example, a joint according to one embodiment may be used in a first region of the longitudinal extent of the wiper blade, whereas a joint according to another embodiment is used in a second region of the longitudinal extent of the wiper blade.

In further typical embodiments, a wiper lip may be provided on the lower part 12 of the wiper blade 2 illustrated in FIG. 3. The wiper blade wipes across the windshield of the vehicle in order to clean said windshield.

For example, the lip may be composed of the same material as the wiper blade. The lip may be composed of a different material. A receptacle may be provided on the lower part of the wiper blade 12 such that the wiper lip can be threaded in. This offers the advantage that, to exchange the wiper blade, only the wiper lip has to be exchanged, and a material saving is thus possible.

According to the embodiments described here, fin-ray wipers for vehicle windshields can be produced in a particularly expedient manner and/or for a multiplicity of different fields of use. It is possible, by way of a modular kit principle or a wiper lever modular kit, for simpler injection-molding tools to be used. Furthermore, elements can be provided as platform parts in high-volume unit quantities and at expedient prices. Different materials can be combined in an expedient and favorable manner by way of the modular kit principle. Furthermore, parts or elements can be optimized in terms of cycle time, which in turn reduces component costs. Owing to the simpler component geometry of the individual elements, it is furthermore possible for possible technical problems in the case of complex components, such as for example wiper levers in ready-from-the-mold form with film hinges, to be reduced or eliminated. Furthermore, a wiper lever modular kit permits a simple exchange of damaged elements. By virtue of the fact that, in a modular kit, only individual parts have to be exchanged, customer satisfaction can be increased. By means of embodiments of the present invention, it is possible for at least one, or multiple, of the above-stated advantages to be at least partially attained. It is possible for a fin-ray wiper with components or elements provided in the context of a modular kit principle, or of a wiper lever modular kit, to be provided.

What is claimed is:

1. A windshield wiper device (2; 28, 30; 74; 78) for a vehicle, comprising:
   an elongate upper part (10) which is configured to be at least partially flexible,
   an elongate lower part (12) which is configured to be at least partially flexible, and
   multiple connecting elements (18) for connecting the upper part (10) and the lower part (12), wherein the connecting elements (18) are spaced apart from one another along a longitudinal extent (8) of the wiper blade (2), wherein each connecting element is a single web structure that extends between the upper part (10) and the lower part (12), wherein the connecting elements (18) are configured to permit a movement of the upper part (10) and of the lower part relative to one another with a movement component along the longitudinal extent (8) of the wiper blade (2), wherein each of the connecting elements (18) is releasably connected by a rotary joint to the lower part (12), and wherein the upper part and the lower part are together releasably coupled to an attachment piece.

2. The windshield wiper device as claimed in claim 1, wherein at least one of the elements selected from the following group can be individually exchanged: the upper part, the lower part, a connecting element of the multiple connecting elements, and the attachment piece.

3. The windshield wiper device as claimed in claim 1, wherein the connecting elements are fastened to the upper part by way of further rotary joints (20; 130; 122).

4. The windshield wiper device as claimed in claim 1, wherein the rotary joints comprise a first joint part (102; 102B; 102C, 102D, 112, 104; 104B; 104C, 104D, 114) and a second joint part (104; 104B; 104C, 104D, 114, 102; 102B; 102C, 102D, 112).

5. The windshield wiper device as claimed in claim 4, wherein the first joint part (102C, 102D, 104, 104B, 114) is of cylindrical or spherical form and the second joint part (102; 102B; 104C, 104D, 112) comprises an undercut for receiving the first joint part.

6. The windshield wiper device as claimed in claim 4, wherein the first and the second joint part are clipped to one another or are plugged together.

7. The windshield wiper device as claimed in claim 1, wherein the upper part (10) and the lower part (12) are fixedly connected to one another, at an outer connecting position (14, 16; 34), wherein the outer connecting position (14, 16; 34) is formed in front of the connecting elements (18) as viewed in a direction pointing from the outside inward in the direction of longitudinal extent (8) of the windshield wiper device (2; 28, 30; 74; 78).

8. The windshield wiper device as claimed in claim 1, wherein longitudinal axes (24) of the connecting elements (18) run at angles (26) relative to the lower part (12), which angles are provided so as to be from 45° to 135°.

9. The windshield wiper device as claimed in claim 1, wherein a spacing (22) between in each case two adjacent connecting elements (18) is less than 50 mm.

10. The windshield wiper device as claimed in claim 1, wherein a flexible windshield wiper lip (80) is attached to a side, which is averted from the upper part (10), of the lower part (12).

11. The windshield wiper device as claimed in claim 10, wherein the windshield wiper lip is inserted into a recess or rail on the lower part.

12. The windshield wiper device as claimed in claim 1, wherein the upper part and/or the lower part has a supply line for water.

13. The windshield wiper device as claimed in claim 12, wherein the supply line is a pipe for conducting water formed integrally with the upper part and/or lower part.

14. The windshield wiper device as claimed in claim 12, wherein the supply line furthermore comprises nozzle openings.

15. The windshield wiper device as claimed in claim 12, wherein the supply line is a pipe for conducting water, the pipe being formed integrally with the upper part and/or lower part.

16. The windshield wiper device as claimed in claim 1, wherein, between the upper part (10) and the lower part (12), there is formed an intermediate space (82) in which there is arranged a spoiler (76) for influencing an air flow which ingresses into the intermediate space (82).

17. The windshield wiper device as claimed in claim 1, wherein the rotary joints (20; 130; 122) have a flexural stiffness of 75 Nmm/rad or less.

18. A method for producing a windshield wiper device as claimed in claim 1, comprising:
   producing an upper part (10) which is configured to be at least partially flexible,
      producing a lower part (12) which is configured to be at least partially flexible,
      producing multiple connecting elements (18) for connecting the upper part (10) and the lower part (12),
      producing an attachment piece, wherein at least one of the elements selected from the following group are produced by injection molding: the upper part, the lower part, the multiple connecting elements, and the attachment piece; and
   assembling the elements selected from the following group: the upper part, the lower part, the multiple connecting elements, and the attachment piece, wherein the connecting elements (18) are spaced apart from one another along a longitudinal extent (8) of the wiper blade (2), wherein the connecting elements (18) are connected by rotary joints to the lower part (12) and to the upper part (10), and wherein the connecting elements (18) are configured to permit a movement of the upper part (10) and of the lower part relative to one another with a movement component along the longitudinal extent (8) of the wiper blade (2).

19. The method as claimed in claim 18, wherein the assembling of the attachment piece comprises plugging, adhesive bonding or lasering.

20. The method as claimed in claim 18, wherein, by way of the elements selected from the following group: the upper part, the lower part, the multiple connecting elements, and the attachment piece, a modular kit is provided, such that different windshield wiper devices can be assembled.

21. A modular kit for the production of at least two windshield wiper devices as claimed in claim 1, the modular kit comprising:
   elements from the following group:
      at least two elongate upper parts (10) which are configured to be at least partially flexible,
      at least two elongate lower parts (12) which are configured to be at least partially flexible, and
      multiple connecting elements (18) for connecting one of the at least two upper parts (10) and one of the at least two lower parts (12), wherein each connecting element is a single web structure that extends between one of the upper parts (10) and lower parts (12), wherein the connecting elements (18) are spaced apart from one another along a longitudinal extent (8) of the wiper blade (2), wherein the connecting elements (18) are configured to permit a movement of the upper part (10) and of the lower part relative to one another with a movement component along the longitudinal extent (8) of the wiper blade (2),
   wherein at least two different windshield wiper devices having a different size or shape from one another can be assembled from the at least two elongate upper parts, the at least two elongate lower parts and the multiple connecting elements, and wherein at least one of the elements used is identical for both of the two different windshield wiper devices.

22. The windshield wiper device as claimed in claim 1, wherein the upper part (10) and the lower part (12) are fixedly connected to one another, in an end region of the windshield wiper device (2; 28, 30; 74; 78), at an outer connecting position (14, 16; 34), wherein the outer connecting position (14, 16; 34) is formed in front of the connecting elements (18) as viewed in a direction pointing from the outside inward in the direction of longitudinal extent (8) of the windshield wiper device (2; 28, 30; 74; 78).

23. The windshield wiper device as claimed in claim 1, wherein longitudinal axes (24) of the connecting elements (18) run at angles (26) relative to the lower part (12), which angles are provided so as to be from 65° to 115°.

24. The windshield wiper device as claimed in claim 1, wherein a spacing (22) between in each case two adjacent connecting elements (18) is less than 30 mm.

25. The windshield wiper device as claimed in claim 1, wherein the rotary joints form hinges between the lower part (12) and the connecting elements (18), and wherein the connecting elements (18) are further releasably coupled to the upper part (10) via additional rotary joints, wherein each of the connecting elements (18) is clipped to both the upper part (10) and the lower part (12).

26. The windshield wiper device as claimed in claim 1, wherein the upper part and lower parts each extend substantially an entire length of the wiper device, and wherein the connecting elements extend parallel to one another and are spaced apart from one another along substantially the entire length of the wiper device.

* * * * *